United States Patent [19]

Davis

[11] Patent Number: 6,000,170
[45] Date of Patent: *Dec. 14, 1999

[54] LIGHT ENERGY SHUTTER SYSTEM

[76] Inventor: Noel Davis, 1360 Ranier La. North, Plymouth, Minn. 55447

[*] Notice: This patent issued on a continued prosecution application filed under 37 CFR 1.53(d), and is subject to the twenty year patent term provisions of 35 U.S.C. 154(a)(2).

[21] Appl. No.: 08/677,447

[22] Filed: Jul. 2, 1996

[51] Int. Cl.$^6$ ........................................... A01G 9/00
[52] U.S. Cl. ...................... 47/17; 47/32.1; 52/1; 52/2.11; 52/173.3; 52/741.1
[58] Field of Search .............................. 47/17 R, 32.1 R; 52/2.11, 1, 173.3, 741.1

[56] References Cited

U.S. PATENT DOCUMENTS

| | | | |
|---|---|---|---|
| 4,000,850 | 1/1977 | Diggs | 237/1 A |
| 4,290,242 | 9/1981 | Gregory, Jr. | 47/17 |
| 4,290,416 | 9/1981 | Maloney | 126/430 |
| 4,805,355 | 2/1989 | Plant | 52/1 |
| 5,335,447 | 8/1994 | Bee | 47/17 |
| 5,433,030 | 7/1995 | Lehman | 47/32.1 |
| 5,675,938 | 10/1997 | McLorg | 52/2.11 |

FOREIGN PATENT DOCUMENTS

| | | | |
|---|---|---|---|
| 2223158 | 11/1972 | Germany | 47/17 I |
| 8105644 | 7/1983 | Netherlands | 47/17 I |
| 8204523 | 6/1984 | Netherlands | 47/17 I |
| 1279562 | 12/1986 | U.S.S.R. | 47/17 I |
| 1482603 | 5/1989 | U.S.S.R. | 47/17 I |
| 1385261 | 2/1975 | United Kingdom | 47/17 I |

OTHER PUBLICATIONS

Perry, R.L., "Reducing Night Heat Losses and Daytime Solar Extremes in Greenhouses", 1975 Annual Meeting American Society of Agricultural Engineers, Paper No. 75–4021, Jun. 22–25, 1975, pp. 1–25.

Rough Brothers Inc. brochure, "Venturion and Venturion II Specifications", 1992.

*Primary Examiner*—Michael J. Carone
*Assistant Examiner*—Joanne C. Downs
*Attorney, Agent, or Firm*—Patterson & Keough, P.A.

[57] ABSTRACT

An apparatus and a method for controlling the amount of solar energy and heat transferred into and out of a building or other structure through a glazed opening using a system of pneumatically actuated, reflective shutters. The air discharged from the blower flows through a venturi. The venturi communicates with a system of inflatable, reflective shutter elements. A control valve downstream from the venturi regulates airflow through the venturi. A photoelectric sensing element is installed at the level of the growing plants. The electric current generated by the sensing element is proportional to the intensity of the sunlight entering through the glazed roof. The control valve is operated by an electrical control means which responds to the electric current generated by the photoelectric sensing element. When the intensity of sunlight exceeds the desired intensity, air flowing through the venturi is restricted and redirected to inflate the inflatable, reflective shutter elements to the degree necessary to obtain the desired intensity of sunlight. The inflatable shutter elements have a specular reflective surface so that sunlight is reflected from the shutter elements without a change in wavelength thus permitting the reflected sunlight to exit through the glazed surface. When the intensity of sunlight is less than the desired intensity, air flow through the venturi is increased thereby creating a low pressure in the venturi and evacuating air from the inflatable reflective shutter elements thus causing the shutter elements to collapse to a minimal thickness and block only a negligible amount of sunlight. The shutter elements are mounted close to the glazed surface in such a manner as conform to the shape of the glazed roof and to provide an insulating barrier when fully inflated thus restricting the flow of heat through the glazed surface. When fully deflated, the reflective shutter elements can be inclined to reflect the sunlight entering at a relatively low angle of incidence in a desired direction to increase the intensity of sunlight at desired locations within the structure.

6 Claims, 4 Drawing Sheets

LIGHT ENERGY SHUTTER SYSTEM

DESCRIPTION

1. Field of the Invention

This invention pertains to a system for regulating the amount of solar energy entering, and the amount of heat transferred, through the roof of a greenhouse, an atrium, a skylight or a similar glazed opening.

2. Background

Greenhouses have long been used successfully for growing a variety of crops in various climates. Solar radiation provides energy for photosynthesis as well as energy for heating the greenhouse. Researchers and greenhouse operators have studied the effects of temperature, humidity and light on many crops which may be grown in greenhouses. However, climatic conditions often make it difficult to maintain the optimum growing conditions throughout the entire year. The most important factor affecting the conditions inside the greenhouse is the amount of solar radiation entering through the glazed roof.

Sunlight is of course the primary variable affecting photosynthesis and plant growth in the greenhouse. More sunlight is available during the summer months than during the winter months. Further, cloud cover, the length of the solar day and other conditions existing outside the greenhouse which tend to reduce the amount of sunlight entering the greenhouse are more prevalent during the winter months than during the summer months. Consequently, greenhouse designers and operators have developed greenhouse designs which maximize the amount of sunlight entering the greenhouse.

The maximum amount of sunlight available at the summer solstice at Latitude 45° N is about 2,000 micromoles/$m^2$/sec. Research has shown that most plants will achieve very nearly their maximum growth rate at a level of sunlight which is substantially lower than this maximum amount of sunlight. An optimum level of sunlight for the growth of a crop such as tomatoes or beans is approximately 500 micromoles/$m^2$/sec. In some experiments, researchers have observed a slow down in photosynthesis attributable to excessive sunlight. Therefore, much of the solar energy entering the greenhouse contributes little to plant growth but greatly to heating the greenhouse through the greenhouse effect.

The greenhouse effect applies in the greenhouse as well as in the atmosphere. The glass roof of the greenhouse is transparent to sunlight. Sunlight enters the greenhouse and strikes objects and structures in the greenhouse which absorb a portion of the energy in the incident sunlight and radiate the balance of the incident energy as longer wavelength radiation. Unfortunately the glazed roof is opaque to the longer wavelength radiation. The inner surface of the glazed roof reflects the longer wavelength light back into the greenhouse and the cycle is repeated, thereby further heating the greenhouse. All objects and internal structures in the greenhouse which are not specular reflectors tend to increase the amount of solar warming by promoting the greenhouse effect.

In general, the amount of solar heating is directly proportional to the amount of sunlight entering the greenhouse through the roof. The warming effect of sunlight is beneficial in cold climates and during the winter months in warmer climates. Solar warming reduces the amount and cost of heating required to maintain the air temperature inside the greenhouse within a desired temperature range. The warming effect of sunlight is less desirable in warm climates and during the summer months in cooler climates. Solar warming may increase the amount and cost of ventilating and cooling required to maintain the interior air temperature within an acceptable temperature range. Greenhouse designers and operators have long sought an effective method for controlling solar heating in greenhouses during summer months. The present invention provides an effective method of reflecting a desired portion of the sunlight upwardly through the glazed roof of the greenhouse, thereby reducing the amount of solar heating.

In addition, the amount of sunlight and solar heating received by the greenhouse varies during any day. During the nighttime hours of darkness, the greenhouse receives no direct sunlight or solar heating. The greenhouse begins to receive direct sunlight and solar heating at sunrise. The intensity of direct sunlight increases steadily during the morning hours, reaches a maximum at local apparent noon, and decreases steadily during the afternoon hours until sunset. Most of the solar energy received by the greenhouse is received during the three hours immediately before and the three hours immediately after local apparent noon when the sunlight enters the greenhouse at a relatively steep angle of incidence and falls almost directly on the crops. The present invention restricts the amount of sunlight entering when the pneumatic shutters are partially inflated, but provides only minimal restriction of sunlight when fully deflated.

During the early morning and late afternoon hours, sunlight enters the green house at a relatively shallow angle of incidence and does not fall directly on the crops. The intensity of sunlight on the crop during those hours may not be sufficient to support photosynthesis and plant growth. Greenhouse designers and operators have long sought a device which is capable of reflecting the sunlight onto the crops, but which will not unduly restrict sunlight entering at higher angles. The present invention satisfies this previously unsatisfied need by rotating the deflated, shutters to reflect the sunlight downward onto the growing crops thereby increasing the length of the period during which photosynthesis occurs.

During the hours from shortly before sunset to shortly after sunrise, little if any sunlight enters the greenhouse through the glazed roof and a substantial amount of cooling occurs when heat is transferred from the air within the greenhouse through the glazed roof to the atmosphere. Inventors have developed a number of devices and techniques for reducing the overnight cooling experienced during the winter months and in northern climates including a system of transparent, inflatable tubes suspended over the growing crops. However, experience has shown that such a device tends to accumulate a large volume of cold air in the large space between the inflatable tubes and the greenhouse roof. When the bags are deflated, that large volume of cold air is dumped directly onto the growing crop. The cold air tends to shock the crop, inhibit growth of the crop and perhaps damage sensitive crops. The present invention overcomes this difficulty by providing a system of opaque, reflective shutters which are located merely inches from the greenhouse roof and when inflated form an insulating blanket which conforms to the shape greenhouse roof and does not trap a large volume of cold air.

Greenhouse operators have employed a number of devices and techniques for regulating solar warming in greenhouses. However, these devices and techniques have not provided effective and cost efficient regulation of the solar energy entering through the glazed roof of the greenhouse The present invention provides an effective, cost efficient system for regulating the amount of solar energy and heat transferred through the glazed roof of the greenhouse.

Similar considerations exist with respect to solar radiation entering buildings through skylights and glazed atriums. However, in those applications, sunlight is desired, not for the purpose of driving photosynthesis, but to provide natural sunlight as a source of interior lighting. Sunlight at an intensity of about 12 to 15 micromoles/m$^2$/sec (i.e. about 70–90 foot candles) is generally considered adequate for interior lighting. Therefore, in those applications, a very large portion of the solar energy entering through the skylight is not necessary for lighting but does serve to heat the building. During the summer months and in southern climates, this additional heat from solar radiation increases the cost of air conditioning unnecessarily and serves to restrict the use of natural lighting. The present invention controls the amount of sunlight entering the building and enables the building to be lighted with natural, color balanced sunlight at any level up to an intensity slightly below the intensity of the sunlight incident upon the glazed surface.

SUMMARY OF THE INVENTION

Accordingly, a general object of the invention is to provide apparatus and a method for controlling the light entering a greenhouse through the glazed roof with a pneumatically actuated, inflatable shutter system. More specifically, a small blower provides a source of airflow to operate a system of inflatable, reflective shutter elements. The air discharged from the blower flows through a venturi. The venturi communicates with a system of inflatable, reflective shutter elements. A control valve downstream from the venturi regulates airflow through the venturi. A photoelectric sensing element is installed at the level of the growing plants. The electric current generated by the sensing element is proportional to the intensity of the sunlight entering through the glazed roof. The control valve is operated by an electrical control means which responds to the electric current generated by the photoelectric sensing element. When the intensity of sunlight exceeds the desired intensity, air flowing through the venturi is restricted and redirected to inflate the inflatable, reflective shutter elements to the degree necessary to obtain the desired intensity of sunlight. The inflatable shutter elements have a specular reflective surface so that sunlight is reflected from the shutter elements without a change in wavelength thus permitting the reflected sunlight to exit through the glazed surface. When the intensity of sunlight is less than the desired intensity, air flow through the venturi is increased thereby creating a low pressure in the venturi and evacuating air from the inflatable reflective shutter elements. When fully deflated, the shutter element collapse to a minimal thickness and thus providing a negligible restriction of entering sunlight.

It is a further object of the invention to provide a lightweight shutter system which can be mounted close to the greenhouse roof so as not to interfere with watering systems and other apparatus commonly mounted above the growing crops.

It is a further object of the invention to provide a shutter system which responds quickly to changes in the intensity of sunlight falling on the growing crops, and which provides continuously variable restriction of the sunlight entering through the roof of the greenhouse.

It is a further object of the invention to provide insulation during the evening and night hours to prevent excessive cooling in the greenhouse. The shutter elements are mounted close to the glazed roof of the greenhouse in such a manner as conform to the shape of the glazed roof and to provide an insulating barrier when fully inflated. More specifically the shutter elements are spaced at desired intervals so that when the shutter elements are fully inflated each touches the adjacent shutter elements, along substantially their entire length, to provide an insulating barrier.

It is a further object of the invention to provide an apparatus for enhancing the sunlight entering the greenhouse during the morning and afternoon hours when the sunlight falls upon the glazed roof of the greenhouse at a relatively low angle of incidence. More specifically, the reflective shutter elements are inclined to reflect the sunlight downward onto the growing plants.

It is a further object of the invention to provide an inflatable, reflective shutter which only minimally restricts the amount of sunlight entering the greenhouse when the shutter elements are fully deflated and which does not deteriorate due to prolonged exposure to sunlight. More specifically this is accomplished by constructing the shutter elements from a thin film polymer which is coated with a thin layer of reflective aluminum and sealed with a thin layer of acrylic polymer. A nylon fabric sleeve is inserted in each end of the shutter element to permit the shutter element to be fully deflated so as to provide a minimal restriction of sunlight entering through the glazed roof. The nylon fabric sleeves further enables each shutter element to be inflated to its maximum diameter along substantially its entire length to provide a complete blockage of sunlight.

It is a further object of the invention to control the sunlight entering buildings through the glazed roofs of atriums and through skylights with the system of inflatable, reflective shutters described above, and to control overnight cooling within the building by providing an insulating barrier as described above.

DESCRIPTION OF THE PREFERRED EMBODIMENTS

Figure 1:
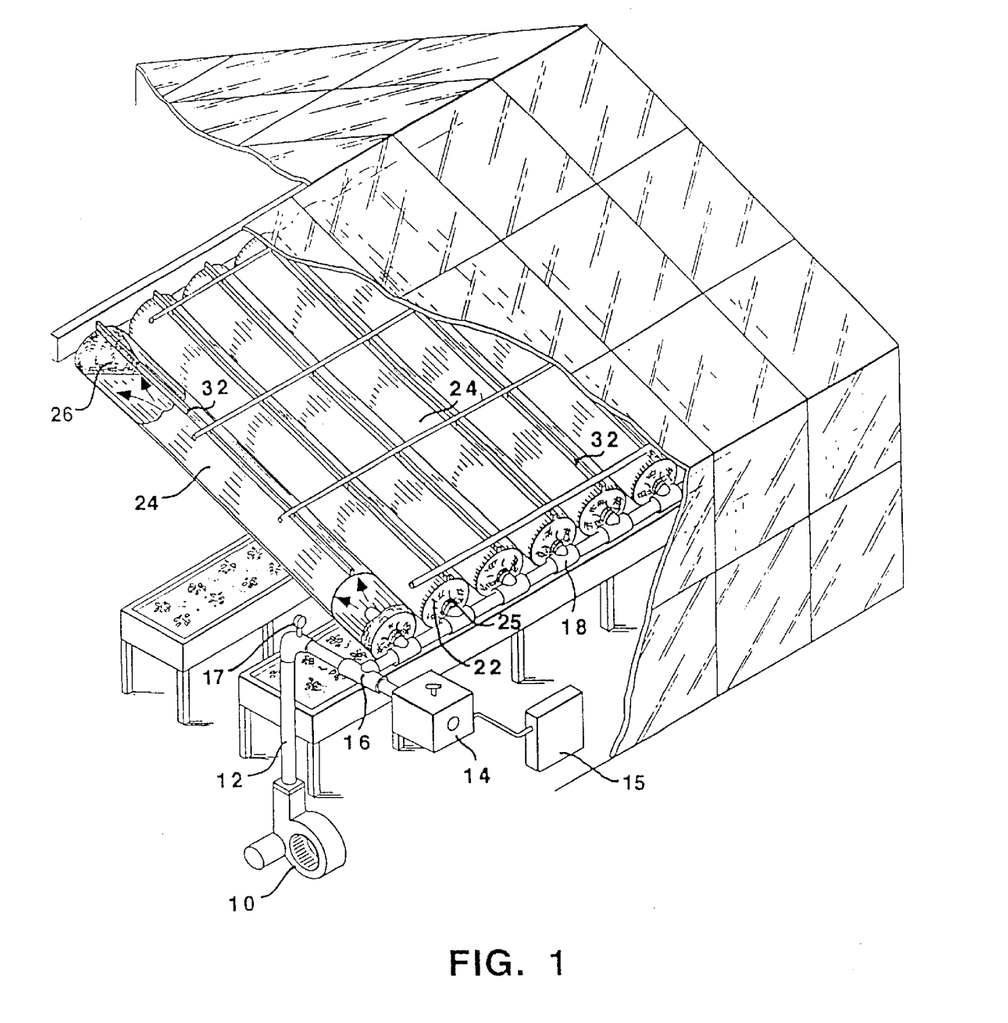
FIG. 1 is a perspective illustration of the invention installed in a greenhouse.

Referring to the several figures in which identical elements are numbered identically throughout, a brief description of the preferred embodiments will now be provided. FIG. 1 provides an illustration of the invention installed in a typical greenhouse which has a glazed roof. The greenhouse is oriented so that the glazed roof generally faces in a southerly direction. The pneumatically operated shutter assembly is mounted inside the greenhouse close to the glazed roof and the shutter elements generally conform the slope of the glazed roof. The tops of the shutter elements are located a few inches from the interior surface of the glazed roof. The shutter elements in FIG. 1 are shown fully inflated. In actual operation, the degree of inflation of the shutter elements would be responsive to the entering sunlight and continuous from the fully deflated state to the fully inflated state. The drawings are not intended to suggest that inflation would occur in discrete steps.

Figure 2:
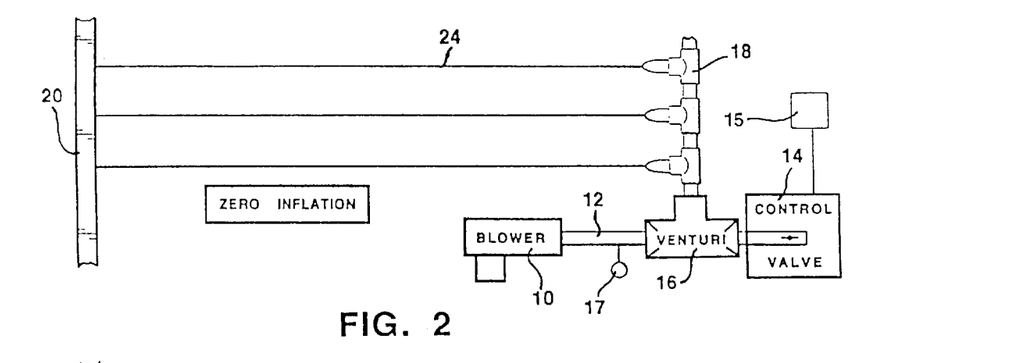
FIG. 2 is a schematic illustration of the invention with the shutter elements fully deflated.

Referring now to FIG. 2, a pneumatically operated shutter according to the present invention is shown. The blower 10 provides a source of air to operate the invention. Those skilled in the art will recognize that any number of commercially available blowers may be used. The blower draws air from the atmosphere and discharges air into a conduit 12. Those skilled in the art will recognize that the conduit must have a cross section sufficient to support the desired rate of airflow. However, the invention does not require a great rate of air flow and although the blower operates continuously, the blower requires only a relatively small amount of power.

A control valve 14 is located in the conduit. The control valve shown is a butterfly valve. However, any number of commercially available throttling valves suitable for controlling airflow could also be used in place of the butterfly valve incorporated in the present embodiment.

A venturi 16 is located in the conduit between the blower and the control valve. The venturi communicates with a supply manifold 18. In the embodiment shown in FIGS. 2, 3 and 4, the conduit is attached directly to the supply manifold and the venturi throat opens directly into the supply manifold. However, those skilled in the art will recognize that it is not necessary to attach the conduit directly to the supply manifold. In practice it may be desirable to locate the blower, conduit, venturi and control valve at a distance from the air shutter assembly and this can be accomplished by connecting the conduit and the supply manifold with additional piping, tubing or conduit of appropriate cross section. The invention requires free communication between the venturi 16 and the supply manifold 18. Those skilled in the art will recognize that the venturi operates most effectively when the airflow through the venturi is laminar and that the blower should not be located so close to the venturi as to result in turbulent airflow through the venturi.

Figure 3:
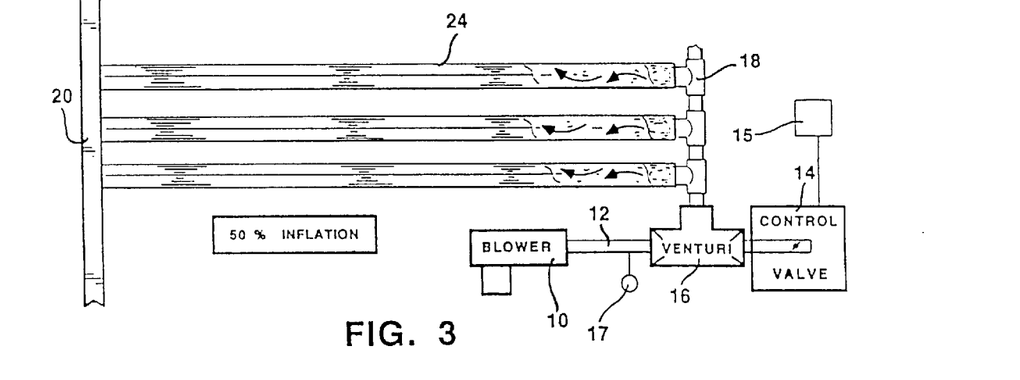
FIG. 3 is a schematic illustration of the invention with the shutter elements partially inflated.
Figure 4:
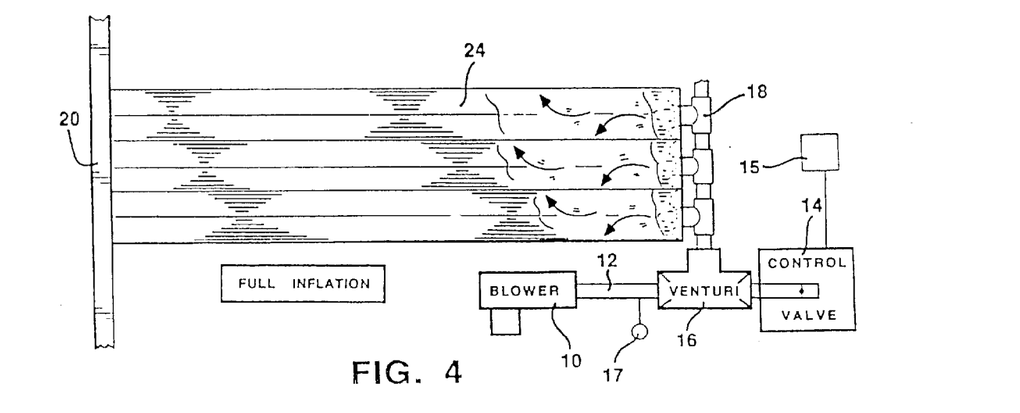
FIG. 4 is a schematic illustration of the invention with the shutter elements fully inflated.

The air shutter assembly is shown in FIGS. 2,3 and 4. A plurality of shutter elements extend between the supply manifold 18 and the ridge 20 of the greenhouse roof. For convenience, only three shutter elements are illustrated. However, in practice a much greater number of shutter elements would be required to conform to the glazed roof of the greenhouse. The shutters elements would be spaced so that when each shutter element is fully inflated it will contact each adjacent shutter element along substantially its entire length. Thus, shutter elements which inflate to a diameter slightly greater than 12 inches would be spaced at 12 inch intervals.

Figure 5:
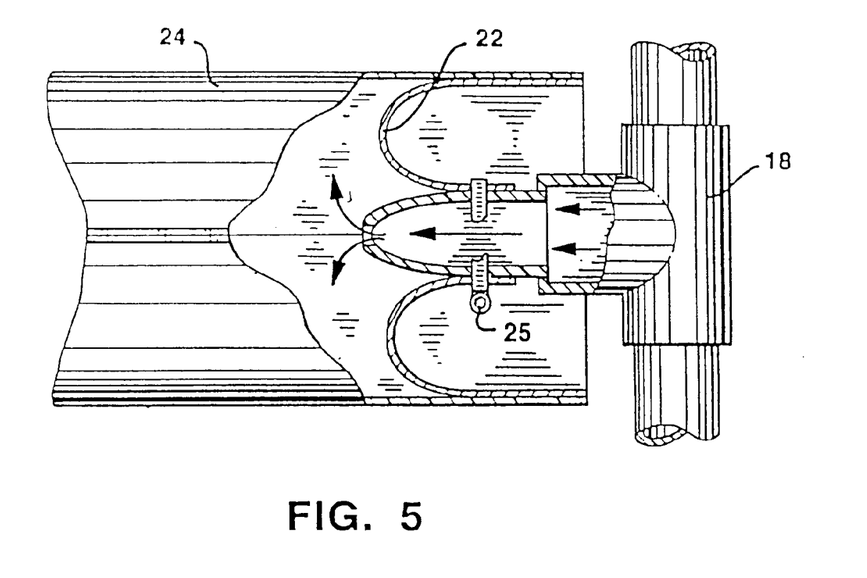
FIG. 5 is a cut away view illustrating the construction of the active end a single shutter element and connection of that single shutter element to the supply manifold.
Figure 6:
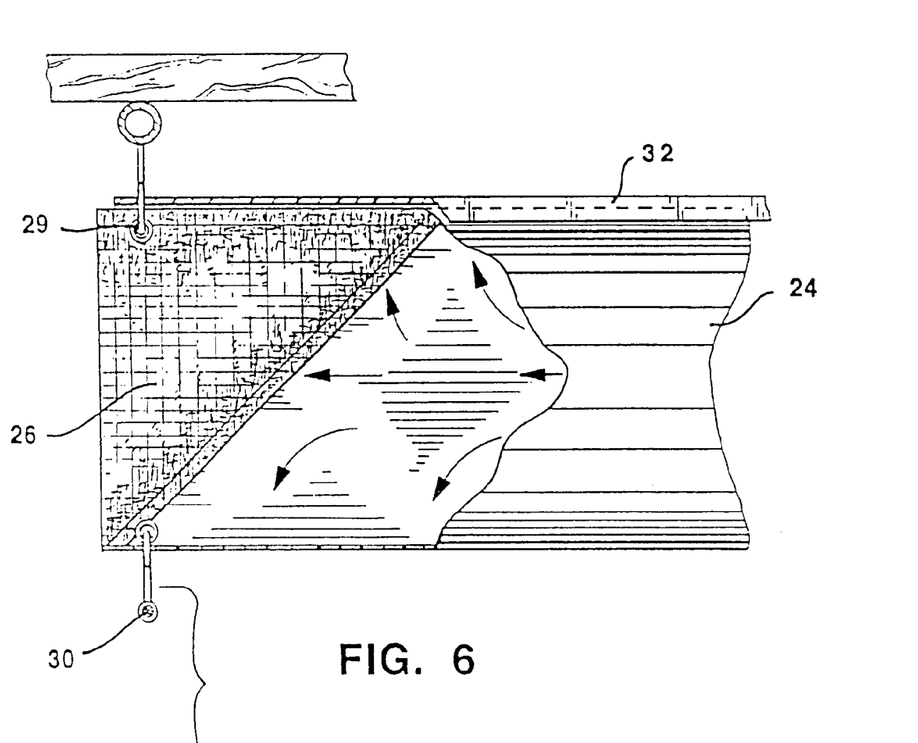
FIG. 6 is a cut away view illustrating the construction of the passive end of a single shutter element.

The construction and attachment of a shutter element is illustrated in FIG. 5. Each shutter element comprises two transition sleeves, an inflatable, reflective tube and a stiffening rib. A first transition sleeve 22 is attached to the inner surface of the inflatable, reflective tube 24 and connected to the supply manifold 18. For convenience, the end of the reflective tube adjacent the supply manifold will be referred to as the active end and end of the reflective tube adjacent the ridge will be referred to as the passive end.

The connections between the first transition sleeve 22, the active end of the inflatable reflective tube 24, and the supply manifold 18 are illustrated in FIG. 5. The first transition sleeve is a fabric tube of the same diameter as the inflatable reflective tube. The first transition sleeve may be made from a fabric which provides a substantially airtight barrier such a nylon rip stop fabric. Those experienced in the art will recognize that a number of suitable fabrics are commercially available. One end of the first transition sleeve is attached to one end of inflatable, reflective tube by gluing, bonding or other convenient method which provides a substantially airtight seal. The opposite end of first transition sleeve is attached to the supply manifold by any convenient method of attachment which provides a substantially airtight connection. The method of connection illustrated is a hose clamp 25. However, those skilled in the art will recognized that there are many other suitable methods of connecting the first transition sleeve to the supply manifold.

The advantage of using a transition sleeve is illustrated in FIG. 5. The inflatable, reflective tube 24 can be inflated to its full diameter immediately adjacent the supply manifold. This provides an improved insulation barrier as well as virtually complete blockage of light when the shutter elements are fully inflated. The transition sleeve is almost fully within the inflatable tube and not subjected to sunlight.

A second transition sleeve 26 is inserted in the passive end of the inflatable, reflective tube 24 as shown in FIG. 5. The shutter element is suspended from the ridge of the greenhouse by any convenient method. The upper edge of each inflatable, reflective tube is attached to the ridge. Those skilled in the art will recognize that the shutter element may be attached to the ridge by any number of acceptable methods, such as the attaching screw 29 shown in FIG. 5. The passive ends of the inflatable tubes are attached at desired spacing. FIG. 5 also illustrates a preferred method of constructing the inflatable reflective tube 24.

A sheet reflective polymer film is used to form the inflatable, reflective tube 24. The sheet of film is cut to a desired length which is slightly greater than the circumference of the fully inflated tube. The ends of the sheet are then glued, bonded or otherwise sealed to form an airtight seam and to form a tube of desired diameter. A stiffening rib 32 may be used to improve airtight seal and to prevent relatively long shutter elements from sagging. However, while the stiffening rib is helpful in longer shutter elements, it is not necessarily essential in shorter shutter elements. The tube is then cut to desired length. A commercially available film which is suitable for use in the invention is Alumilux™ SA-85 High Performance Specular Reflective Film manufactured by 3M. Those skilled in the art will recognize that other commercially available products may be used to form the inflatable reflective tubes. A suitable film comprises a thin, polymer film having one surface coated with a thin layer of highly reflective material such as aluminum with a transparent layer of acrylic overcoating to preserve the bright, reflective surface and retard deterioration caused by prolonged exposure to sunlight.

Before the passive end of the inflatable, reflective tube is sealed, a second transition sleeve 26 is inserted in the passive end. The second transition sleeve is a conical shaped fabric cone made of nylon ripstop or other suitable substantially airtight fabric. The circumference of the base of the cone is equal to the circumference of the fully inflated inflatable reflective tube 24 and the base of the conical second transition sleeve is glued, bonded or otherwise attached to the inner surface of the inflatable reflective tube to form an airtight seal. The advantage of the second transition sleeve is illustrated in FIG. 5. The cross-section of each fully inflated tube is circular and each fully inflated reflective tube touches each adjacent fully inflated reflective tube along its entire length thereby allowing the shutter to exclude all sunlight when fully inflated. The fully deflated reflective tube assumes the shape of very thin strip, only about 0.030 inches in thickness, thereby permitting almost all the sunlight entering through the glazed roof to reach the growing crops.

In one preferred embodiment, bottom of the passive end of each inflatable reflective tube is connected to a shutter rotation means which comprises a cord 30, a drive pulley, a slave pulley, two idler pulleys, one swivelly attached to the drive pulley and the other swivelly attached to the slave pulley and a motor for turning the drive pulley and a controller. When the cord is displaced the reflective surface of the fully deflated tube will provide a mirror-like surface oblique to the surface of the glazed roof Sunlight entering through the glazed roof at a shallow angle will be reflected by the shutter element downward onto the leaves of the growing plants. Sunlight enters the greenhouse through the glazed roof at a shallow angle during the hours just after sunrise and just before sunset. Without the reflective feature of the shutter, the amount of sunlight reaching the leaves of the growing plants would not be sufficient to promote photosynthesis during substantial portion of those hours. The shutter thus permits the effective length of the growing day to be extended by a few hours.

Figure 7:
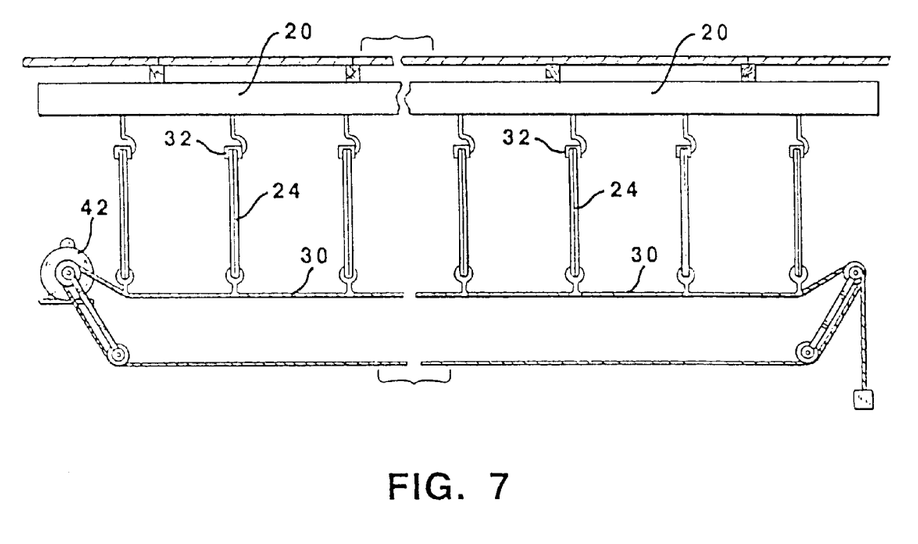
FIG. 7 is a elevation view illustrating the shutter rotation means.

The cord 30 is displaced according to the time of day and date. During the period from about sunrise (which varies from day to day) until approximately two hours after sunrise, the cord is displaced, by rotation of the drive pulley, so that the lower end of the shutter element is displaced westward. The shutter is thereby aligned at an angle of approximately 30 degrees from the vertical to reflect incoming sunlight downward onto the growing plants. During the period from about two hours after sunrise until about two hours before sunset, the cord is displaced to the neutral position, normal to the inner surface of the glazed roof, so that the essentially planar surfaces of the sides of the fully deflated inflatable reflective tubes are vertical. During the period from approximately two hours before sunset until sunset (which varies from day to day), the cord is displaced, by rotation of the drive pulley, so that the lower end of the shutter element is displaced eastward. Thus the shutter element is aligned at an angle of approximately 30 degrees from the vertical to reflect incoming sunlight onto the growing plants. The times of sunrise, local apparent noon and sunset at any location vary throughout the year according to the date. Displacement of the cord is accomplished the rotation of the drive pulley by an electrical motor controlled by a commercially available timer circuit (not illustrated in the drawings) in the preferred embodiments illustrated in the drawings. The idler pulleys are swivelly attached to the drive pulley and the slave pulley, respectively, by swivel arm members, to permit the cord 30 to rise and fall as the reflective tubes are inflated and deflated. In some installations, it may be necessary or desirable to provide spring biasing for the swivel arms. The cord 30 may be constructed of fiber rope, wire rope, chain, elastic cord or other functionally equivalent material and may be constructed as a continuous loop. In the preferred embodiment shown in FIG. 7, a weight, W, is wound around a sheaf of slave pulley and provides tension in cord 30 and also provides a small force to encourage the deflated shutter elements to hang vertically. Thus the shutter rotation means in the preferred embodiments has been constructed so as not to interfere with the inflation of the shutter elements. Those skilled in the art will recognize that it is possible to construct a functionally equivalent shutter rotation means employing only one drive pulley, or employing a spring biasing means in place of the weight W. Those skilled in the art will also recognize that other, functionally equivalent shutter rotation means such as, for example, a shutter bar, could be used in place of the cord and pulley assembly used in the preferred embodiment without departing from the scope and spirit of the invention. In installation requiring longer inflatable shutter elements, shutter rotation means may be located at desired intervals to prevent curling of the shutter elements. In some installations, it may be desirable to enclose cord 30 in a plurality of relatively rigid spacers, one spacer being located between adjacent inflatable shutters. Further, those skilled in the art will recognize that the rotation of the shutter elements could be controlled by a number of mechanical or electro-mechanical timers which are the functional equivalent of the timer circuit used in the preferred embodiments.

OPERATION

The embodiment illustrated in FIG. 1 operates as follows. When the control valve is in a partially open, mid position, the blower forces air through the conduit and the control valve to exhaust into the atmosphere. Because the airflow through the venturi is constricted, a positive pressure is induced in the venturi throat and air flows through the venturi throat and into the supply manifold. Air will then flow from the supply manifold into the shutters and thereby cause the inflatable tubes to inflate. This inflation will continue until the air pressure in the shutter balances the air pressure in the supply manifold and in the venturi throat to stop further airflow into the shutters. The shutter elements communicate pneumatically through the supply manifold and therefore will achieve a uniform degree of inflation. The transition sleeves provide the necessary air tight seal with the supply manifold and are shaped so that the inflatable tubes can be inflated to achieve the desired circular cross section at the ends of the inflatable tubes. When the control valve approaches the fully shut position, the inflatable tubes are fully inflated and each inflatable tube presses against each adjacent inflatable tube along substantially its entire length thereby creating a reflective, insulating blanket located a few inches below the glazed surface. The transition sleeves permit the inflatable tubes to be inflated to a circular cross section at the ends of the inflatable tubes.

When the control valve is shifted to a position that is nearly fully open, airflow through the venturi increases thereby creating a reduced pressure in the venturi throat and causing air to flow from the supply manifold into the conduit and from the inflatable tubes into the supply manifold thereby causing the inflatable tubes to deflate. This deflation will continue until the inflatable tubes are fully deflated. When the inflatable tubes are fully evacuated they will flatten out to form a sheet approximately 0.030 inches in thickness. The transition sleeves are of sufficient length to encourage the inflatable tubes to collapse to parallel thin sheets at the ends of the inflatable tubes when fully deflated. This result is achieved because of the transition sleeves.

A light sensing element 15 is located beneath the air shutter assembly. Those skilled in the art will recognize that a number of commercially available light sensors may be used in the invention. A control valve operating means receives an input from the light sensing element and, in response to the intensity of light falling on the light sensing element, causes the control valve to be urged toward the open or the shut position. When the light intensity exceeds a selected, preset value, the control valve is urged toward the shut position thereby inflating the inflatable tubes and reducing the amount of light passing through the air shutter assembly. Conversely, when the light intensity falls below the predetermined value, the control valve is urged toward the open position thereby deflating the inflatable tubes and reducing the amount of light passing through the air shutter assembly.

Having described the present invention in its preferred embodiments, it will be appreciated that modifications and equivalents of the disclosed concepts may become apparent to those skilled in the art. It is intended that such modifications and equivalents be included within the scope of the present invention.

What is claimed is:

1. A method of regulating transmission of light energy into a greenhouse having a peaked roof, the peaked roof having a ridge at its uppermost portion and having a lower edge, the method comprising:

providing a plurality of inflatable shutter elements adjacent to and underneath the peaked roof of the greenhouse, each shutter element having a high end and a low end opposite the high end, the high end of each shutter element being disposed proximate the ridge of the roof and the low end of each shutter element being disposed proximate the lower edge of the roof, the high ends of respective shutter elements extending successively along the ridge and the low ends of respective shutter elements extending successively along the lower edge;

creating an airflow through a conduit that communicates with the plurality of inflatable shutter elements;

regulating the airflow through the conduit with a light-responsive control valve;

inflating the plurality of inflatable shutter elements, responsive to an increased transmission of light into the greenhouse, to increase the amount of light reflected by the plurality of inflatable shutter elements through the roof of the greenhouse and to decrease the amount of light passing between individual shutter elements into the greenhouse; and deflating the plurality of inflatable shutter elements, responsive to a decreased transmission of light into the greenhouse, to decrease the amount of light reflected by the plurality of inflatable shutter elements through the roof of the greenhouse and to increase the amount of light passing between individual shutter elements into the greenhouse.

2. The method of claim 1, further comprising minimizing the amount of cold air dropped from a space between the roof and the plurality of inflatable shutter elements, by disposing the plurality of inflatable shutter elements within a few inches from the interior surface of the roof.

3. The method of claim 1, wherein the plurality of inflatable shutter elements are disposed to generally conform to the shape of the roof.

4. The method of claim 1, further comprising:

using the plurality of inflatable shutter elements to reflect into the greenhouse light that passes through the roof; and changing the angular orientation of the plurality of inflatable shutter elements, dependent on the time of day, to change the amount of light reflected into the greenhouse by the inflatable shutter elements.

5. The method of claim 1, further comprising:

providing a transition sleeve within each shutter element, the transition sleeve providing a substantially sealed connection between the shutter element and a manifold connected to the conduit.

6. The method of claim 5, wherein the transition sleeve allows the shutter element to be inflated to its full diameter immediately adjacent the manifold.

* * * * *

UNITED STATES PATENT AND TRADEMARK OFFICE
CERTIFICATE OF CORRECTION

PATENT NO. : 6,000,170
DATED : December 14, 1999
INVENTOR(S) : Davis

It is certified that error appears in the above-identified patent and that said Letters Patent is hereby corrected as shown below:

Column 2, line 38, after "deflated" delete --,--.

Column 3, line 1, after "house" insert --.--.

Column 4, line 28, delete "sleeves" and insert --sleeve--.

Column 4, line 49, after "end" insert --of--.

Column 4, line 67, after "conform" insert --to--.

Column 5, line 45, after "2," insert a space.

Column 5, line 51, delete "shutters" and insert --shutter--.

Column 5, line 67, after "inflatable" insert --,--.

Column 6, line 34, after "inflatable" insert --,--.

Column 6, line 39, delete "seam" and insert --seal--.

Column 6, line 41, after "improve" insert --the--.

Column 6, line 45, after "to" insert --the--.

Column 6, line 56, after "tube" insert --24--.

Column 6, line 58, after "sleeve" insert --26--.

Column 6, line 62, after "inflatable" insert --,--.

UNITED STATES PATENT AND TRADEMARK OFFICE
CERTIFICATE OF CORRECTION

PATENT NO. : 6,000,170
DATED : December 14, 1999
INVENTOR(S) : Davis

It is certified that error appears in the above-identified patent and that said Letters Patent is hereby corrected as shown below:

Column 6, line 63, after "sleeve" insert --26--.

Column 7, line 15, after "roof" insert --,--.

Column 7, line 24, after "during" insert --a--.

Column 7, line 48, after "accomplished" insert --by--.

Column 8, line 57, after "element" delete "15".

Signed and Sealed this

Ninth Day of January, 2001

Attest:

Q. TODD DICKINSON

Attesting Officer

Commissioner of Patents and Trademarks